(12) United States Patent
Cricri et al.

(10) Patent No.: US 10,482,641 B2
(45) Date of Patent: Nov. 19, 2019

(54) VIRTUAL REALITY DISPLAY

(71) Applicant: Nokia Technologies Oy, Espoo (FI)

(72) Inventors: Francesco Cricri, Tampere (FI); Jukka Pentti Paivio Saarinen, Nokia (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 15/591,540

(22) Filed: May 10, 2017

(65) Prior Publication Data

US 2017/0337720 A1  Nov. 23, 2017

(30) Foreign Application Priority Data

May 20, 2016 (GB) ................... 1608886.6

(51) Int. Cl.
| | |
|---|---|
| *G06T 11/60* | (2006.01) |
| *G06F 3/01* | (2006.01) |
| *G06K 9/00* | (2006.01) |
| *G06F 3/0484* | (2013.01) |

(52) U.S. Cl.
CPC .............. *G06T 11/60* (2013.01); *G06F 3/013* (2013.01); *G06K 9/00711* (2013.01); *G06F 3/012* (2013.01); *G06F 3/04842* (2013.01); *G06K 2009/00738* (2013.01); *G06T 2210/22* (2013.01)

(58) Field of Classification Search
CPC . G06T 11/60; G06T 2210/22; G06K 9/00711; G06K 2009/00738; G06F 3/013; G06F 3/012; G06F 3/04842; G06F 3/011
USPC ................................................ 345/633, 629
See application file for complete search history.

(56) References Cited

U.S. PATENT DOCUMENTS

| | | | |
|---|---|---|---|
| 9,081,177 B2 | 7/2015 | Wong et al. | |
| 2009/0293012 A1 | 11/2009 | Alter et al. | |
| 2010/0123737 A1* | 5/2010 | Williamson | G01C 21/3647 345/672 |
| 2010/0182340 A1* | 7/2010 | Bachelder | G02B 27/017 345/633 |
| 2011/0145257 A1* | 6/2011 | McDonald | G06T 1/00 707/743 |

(Continued)

FOREIGN PATENT DOCUMENTS

| | | |
|---|---|---|
| WO | 2012/101720 A1 | 8/2012 |
| WO | 2015/090421 A1 | 6/2015 |

OTHER PUBLICATIONS

Extended European Search Report received for corresponding European Patent Application No. 17171688.9, dated Sep. 8, 2017, 8 pages.

(Continued)

*Primary Examiner* — Ke Xiao
*Assistant Examiner* — Kim Thanh T Tran
(74) *Attorney, Agent, or Firm* — Alston & Bird LLP (57) ABSTRACT

A method comprises providing video data representing at least part of virtual space to a user for viewing, identifying a current viewed sector of the virtual space based on user position, determining a sub-portion of said viewing sector, identifying an event occurring in a non-viewed sector of the virtual space, and displaying content indicative of the event in the sub-portion of said current viewing sector. The displaying step may comprise displaying a graphical notification of the event in the sub-portion, or in alternative embodiments, displaying video data showing the event in the sub-portion.

19 Claims, 11 Drawing Sheets

(56) References Cited

U.S. PATENT DOCUMENTS

| | | | | |
|---|---|---|---|---|
| 2012/0154591 | A1* | 6/2012 | Baur | B60R 1/00 348/148 |
| 2012/0313965 | A1* | 12/2012 | Mochizuki | G06F 17/30817 345/619 |
| 2014/0160289 | A1* | 6/2014 | Lee | G06K 9/00805 348/148 |
| 2014/0375683 | A1* | 12/2014 | Salter | G06F 3/013 345/633 |
| 2015/0243079 | A1 | 8/2015 | Cho et al. | |
| 2016/0150212 | A1* | 5/2016 | Moura | H04N 19/597 375/240.02 |
| 2017/0154245 | A1* | 6/2017 | Osindero | G06K 9/6256 |

OTHER PUBLICATIONS

Schinke et al., "Visualization of Off-Screen Objects in Mobile Augmented Reality", Proceedings of the 12th Conference on Human-Computer Interaction with Mobile Devices and Services, Sep. 7-10, 2010, pp. 313-316.

Office Action for European Application No. 17 171 688.9 dated Mar. 7, 2019, 4 pages.

Search Report received for corresponding United Kingdom Patent Application No. 1608886.6, dated Nov. 29, 2016, 8 pages.

"Off Screen Indicator. Testing VR With Oculus Rift", YouTube, Retrieved on Apr. 19, 2017, Webpage available at : https://www.youtube.com/watch?v=pjBmPCPvu64.

Summons to Attend Oral Proceedings for European Application No. 17171688.9 dated Sep. 9, 2019, 7 pages.

\* cited by examiner

VIRTUAL REALITY DISPLAY

FIELD

This specification relates generally to a method and system for virtual reality display, particularly virtual reality display in which events occurring out of a user's viewing area are notified in the viewing area.

BACKGROUND

Virtual reality is an immersive form of multimedia which involves displaying a virtual world within a user device, which is typically a headset worn by the user which has two screens (one for each eye) displaying part of the virtual world dependent on the position and/or orientation of the user detected using sensors. Headphones are also usually provided in the headset providing audio and thereby augmenting the virtual experience. The virtual world may be computer generated from a real world space captured using a suitable camera system comprising multiple camera sensors oriented in respective directions, typically capturing a 360 degree view field. Nokia's OZO® camera is one such device, providing both spatial video and audio signals for processing and rendering using suitable virtual reality software on a computer system. Sensor signals received from the headset are used by the computer system to determine the spatial location and eye orientation of the user within the virtual space, and therefore a view sector to display to the screens. The view sector will be a limited angle, less than the full view field and leaves one or more non-viewed sectors within which events may occur. The virtual world may be delivered by a live feed from the camera in a real world space, or may be stored in advance.

Events occurring within a non-viewed sector of the virtual world may be of interest to the user. However, the user is required to turn their head away from the viewed sector to view this event, which may actually be less interesting or important than the event they were originally viewing.

SUMMARY

According to one aspect, a method comprises: providing video data representing at least part of virtual space to a user for viewing; identifying a current viewed sector of the virtual space based on user position; determining a sub-portion of said viewing sector; identifying an event occurring in a non-viewed sector of the virtual space; and displaying content indicative of the event in the sub-portion of said current viewing sector.

The displaying step may comprise displaying a graphical notification of the event in the sub-portion.

The displaying step may comprise displaying video data showing the event in the sub-portion.

The step of determining the sub-portion may comprise receiving manual selection through a user interface.

The step of determining the sub-portion may be performed automatically using image or video attributes within the viewed sector.

The step of determining the sub-portion may use predefined rules to identify substantially static and/or uniform graphical areas within the viewed sector.

Multiple possible sub-portions may be identified and ranked using the predefined rules, and wherein the method further comprises selecting a sub-portion based on rank.

The method may further comprise detecting a focal area within the current viewed sector and wherein the sub-portion is determined to be outside of the focal area.

The step of detecting the focal area may be based on the detected gaze direction of the user.

A trained model may be used to determine the sub-portion.

The step of identifying the event may comprise receiving manual selection through a user interface.

The step of identifying the event may be performed automatically using predefined rules.

The step of identifying the event may be performed automatically using a trained model. The trained model may use a convolutional neural network and a recurrent neural network.

The non-viewed sector may be divided into multiple sub-sectors and each is analysed individually to identify an event.

The method may further comprise receiving video data corresponding to different spatial crop areas of the non-viewed sector(s) and wherein if the identified event occurs within multiple crop areas, the displaying step displays video data from the smallest crop area.

The video data showing the identified event may be substantially kept the same size when displayed.

The video data showing the identified event may be transformed in correspondence to the sub-portion.

The video data showing the identified event may be transformed from a three-dimensional or polar representation to a two-dimensional representation.

According to a second aspect, there may be provided a computer program comprising instructions that when executed by a computer apparatus control it to perform the method.

According to a third aspect, there may be provided a non-transitory computer-readable storage medium having stored thereon computer-readable code, which, when executed by at least one processor, causes the at least one processor to perform a method, comprising: providing video data representing at least part of a virtual space to a user for viewing; identifying a current viewed sector of the virtual space based on user position; determining a sub-portion of said viewing sector; identifying an event occurring in a non-viewed sector of the virtual space; and displaying content indicative of the event in the sub-portion of said current viewing sector.

According to a fourth aspect, there may be provided an apparatus, the apparatus having at least one processor and at least one memory having computer-readable code stored thereon which when executed controls the at least one processor of an audio capture apparatus: to provide video data representing at least part of a virtual space to a user for viewing; to identify a current viewed sector of the virtual space based on user position; to determine a sub-portion of said viewing sector; to identify an event occurring in a non-viewed sector of the virtual space; and to display content indicative of the event in the sub-portion of said current viewing sector. The apparatus may be further configured to perform the above embodiments of the method.

According to a fifth aspect, there may be provided an apparatus comprising means for providing video data representing at least part of a virtual space to a user for viewing; means for identifying a current viewed sector of the virtual space based on user position; means for determining a sub-portion of said viewing sector; means for identifying an event occurring in a non-viewed sector of the virtual space; and means for displaying content indicative of the event in the sub-portion of said current viewing sector. The apparatus may further comprise means for performing the above embodiments of the method.

BRIEF DESCRIPTION OF THE DRAWINGS

Embodiments will now be described, by way of non-limiting example, with reference to the accompanying drawings, in which.

DETAILED DESCRIPTION OF SOME EMBODIMENTS

Embodiments herein relate to virtual reality (VR) methods and systems, in which a user is provided with a live or stored video feed representing a virtual space. Spatial audio may also be provided.

In this context, a virtual space is any computer generated version of a space, for example a captured real world space, in which a user can be immersed through a visual interface device such as a VR headset.

In some embodiments, a live feed may be provided by a VR system that receives a current version of a real world space from one or more cameras in said space, such as the abovementioned OZO camera which incorporates multiple video sensors. In some embodiments, the virtual space is stored on memory of the VR system and possibly pre or post-processed by user interaction through a user interface of the system prior to delivery to the user.

What is presented by the VR system to the user is determined by data signals received from a VR headset worn by the user indicative of one or more of its spatial position and orientation. For ease of reference, we refer to these signals as position signals or position data. The VR headset incorporates motion tracking sensors which may include gyroscopes, accelerometers and structured light systems. These sensors generate the position data from which the current viewing field, or sector, is determined and updated as the user changes position. The VR headset will typically comprise two digital screens for displaying stereoscopic video images of the virtual world in front of respective eyes of the user, and also two speakers for delivering audio, if provided from the VR system. The embodiments herein, which primarily relate to the delivery of VR content, are not limited to a particular type of VR headset.

Figure 1:
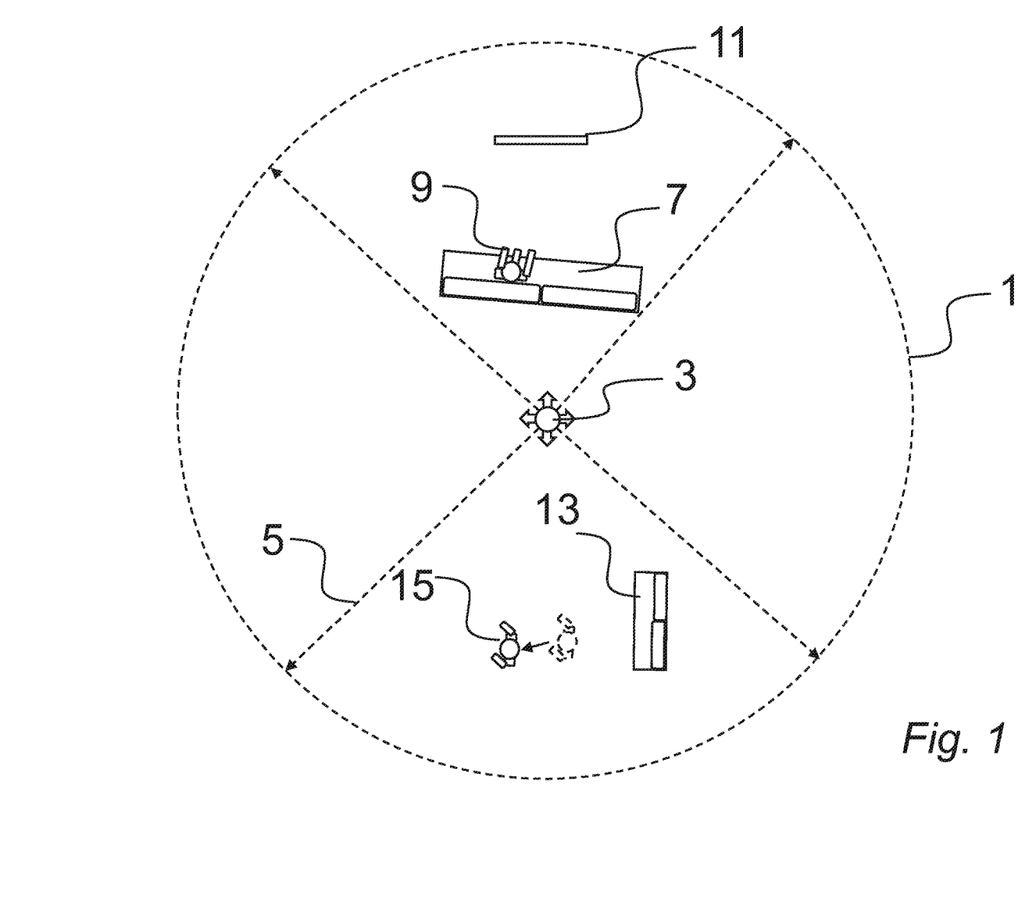
FIG. 1 is a top-plan view of a real world capture situation for creating a virtual reality version, which is useful for understanding embodiments.

Referring to FIG. 1, an example of capturing VR video content is shown in relation to a real world space 1 shown in top plan view. Within the space 1 is a camera system 3, which may be multiple cameras or Nokia's OZO system, which captures in real-time video with a horizontal, 360 degree field-of-view, indicated generally by arrows 5. In the vertical plane, a 360 degree field-of-view may be captured to create a complete spherical world, or alternatively, a more limited angle may be used. Within this field-of-view are various objects, including a sofa 7 on which is seated a first person 9. In front of the sofa 7 is a television 11. Spatially behind the sofa 7 is a second sofa 13 and a second person 15 who may or may not be moving.

Figure 2:
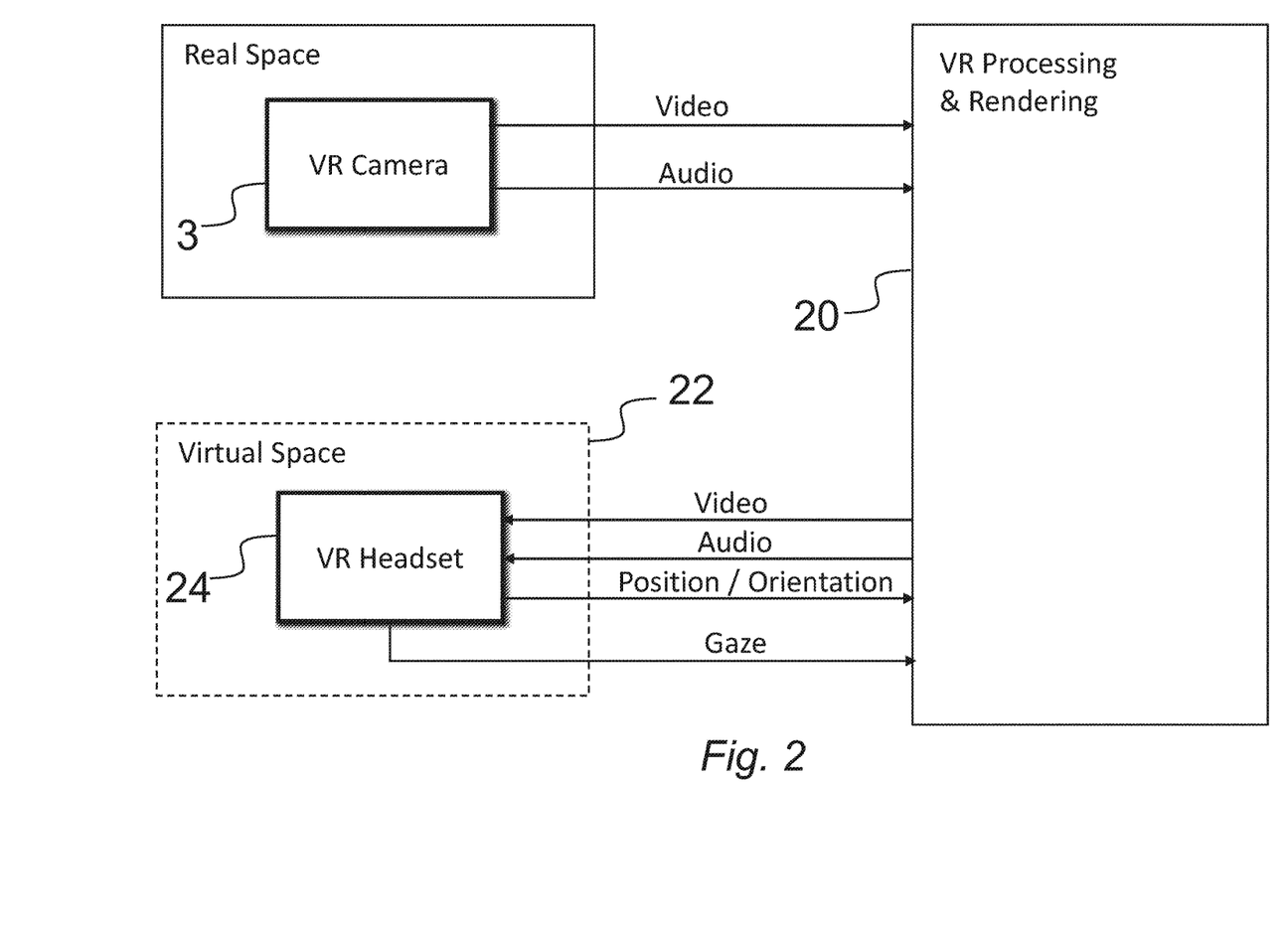
FIG. 2 is a schematic diagram illustrating components of a virtual reality system in relation to capture and playback devices.

Referring to FIG. 2, a VR processing and rendering system 20 (hereafter referred to simply as the VR system) is shown in relation to the camera 3 for generating a virtual space 22 displayed in computer-generated form within a VR headset 24. The VR system 20 receives from the camera 3 video and audio data and generates the virtual space 22 in data form ready for display to the VR headset 24.

In use, the VR system 20 receives from the VR headset 24 position data, and responsive thereto delivers to the headset video and audio data corresponding to a limited spatial sector of the virtual space which the user is currently looking at.

A sector refers to any sub-portion of the available spatial field, in this case less than 360 degrees and more likely to be in the order of 70-100 degrees. As the user changes position, a different sector of the available spatial field is delivered in real time or near real time. The different sector may overlap with a previous sector.

Reference to position and position data refers to any parameter indicative of user positioning and/or orientation within the virtual space which can be used to determine what sector the user views at a particular point in time. Position can include the spatial position within the virtual space, for example in terms of Cartesian or polar co-ordinates or distance from a reference position. Position can also be indicative of orientation of the headset in terms of horizontal and/or vertical direction relative to a reference direction, e.g. 10 degrees from a reference direction.

For example, a gyroscope is an example of a motion tracking sensor within a VR headset which can detect orientation based on a measured change in direction from a reference position.

In general, the position can be deduced based on signals received from motion tracking sensors on the VR headset, which will typically incorporate one or more of gyroscopes, accelerometers and/or structured light systems. In other embodiments, optical, electromagnetic and/or audio tracking sensors can also be used. In other embodiments, position can be determined by sensors external to the VR headset, for example one or more cameras directed at a user carrying markers.

Additionally, or alternatively, the spatial position can be determined by the user carrying a positioning tag (not shown) which may directly or indirectly deliver data indicative of the user position to the VR system 20. The positioning tag may be a High Accuracy Indoor Positioning (HAIP) tag which works in association with one or more HAIP locators.

In addition to the position, the processing system 20 can also take into account data indicating the current gaze direction or focus area of the user, which can be received from the VR headset 24 using eye tracking technology. Eye tracking technology may employ cameras mounted on the inside of the VR headset which are directed towards the user's eyes and measure changes in direction from a reference position, which is usually set when the eyes are looking directly ahead.

Figure 3:
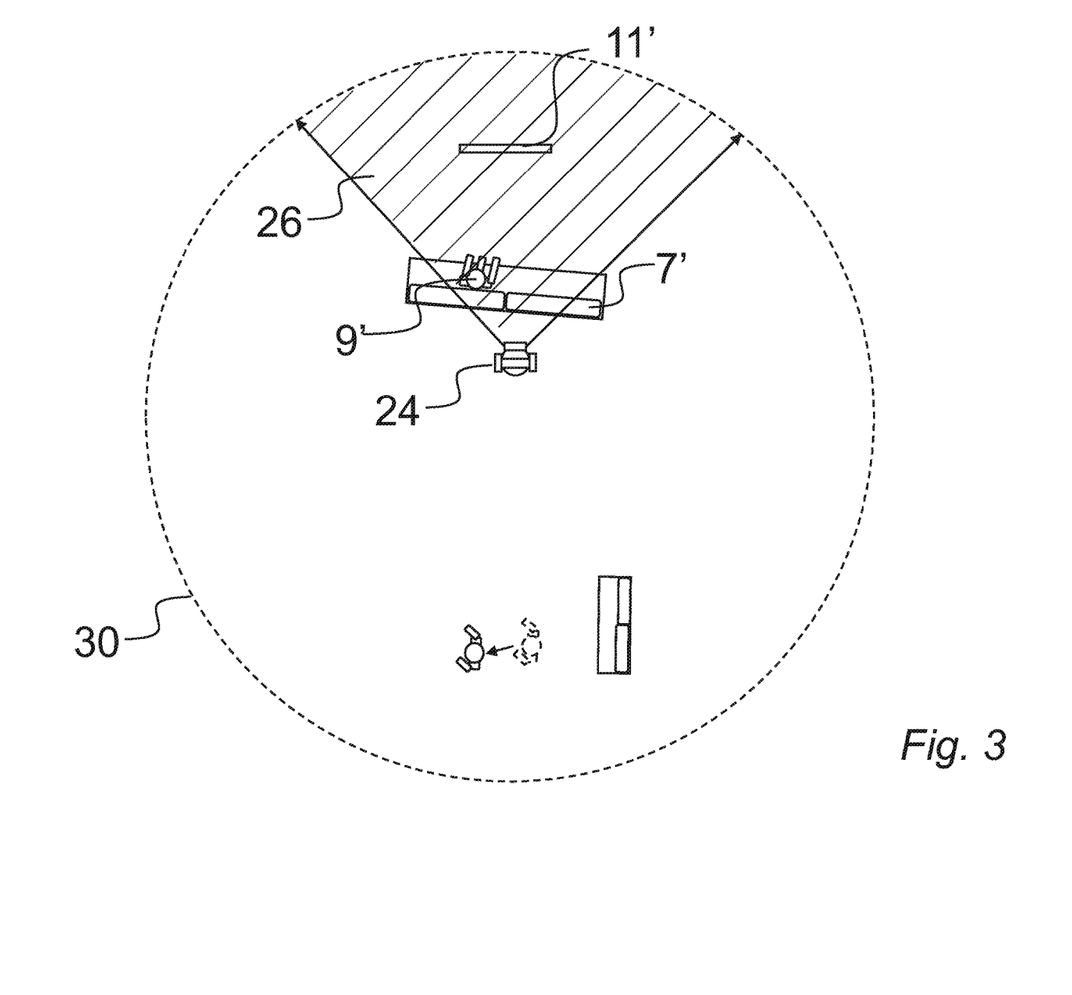
FIG. 3 is a top-plan view of a virtual reality space created using the FIG. 2 system.

Referring now to FIG. 3, a virtual space 30 corresponding to that captured by the VR system 20 is shown, again in top plan view. The user with VR headset 24 is shown within said virtual space 30 with a limited field of view indicated by the shaded sector 26. Responsive to this orientation, the VR headset 24 will display to the user a computer-generated version of the sofa 7', first person 9' and the television 11' for which see also FIG. 4 which gives the user's view.

Figure 5:
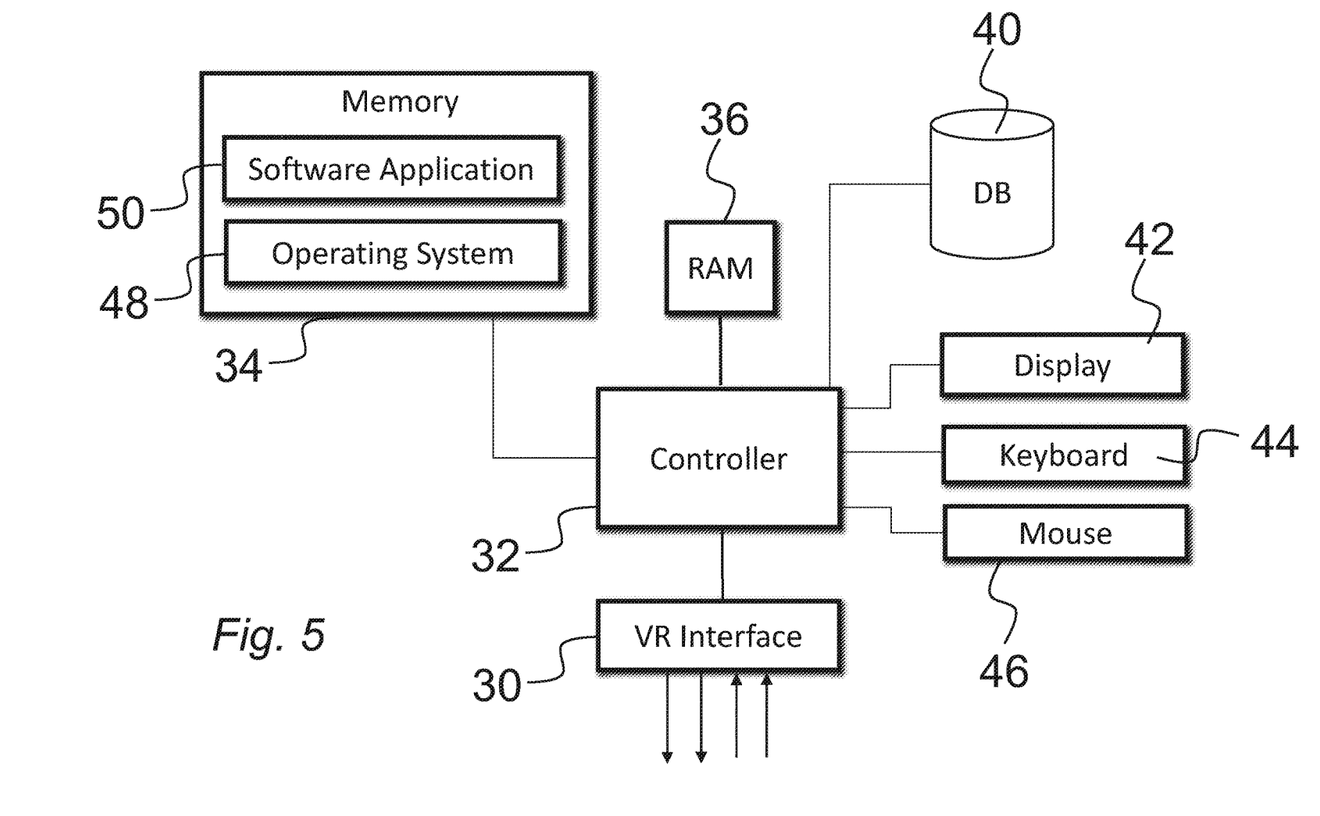
FIG. 5 is a schematic diagram showing components of the virtual reality system in accordance with an embodiment.

For completeness, and referring now to FIG. 5, an example schematic diagram of components of the VR system 20 is shown. The VR system 20 has a controller 32, a memory 34, RAM 36 and a VR interface 38 to the VR headset 24, for transmitting and receiving the signals shown in FIG. 2. A database 40 may also be provided for storing such data as rulesets and/or trained learning models to be described later on. A display 42, keyboard 44 and mouse 46 may also be provided for displaying and interacting with a user interface, which is needed in situations where some manual control, interaction or video processing is involved, as will be described. The controller 32 is connected to each of the other components in order to control operation thereof.

The memory 34 may be a non-volatile memory such as read only memory (ROM) a hard disk drive (HDD) or a solid state drive (SSD). The memory 34 stores, amongst other things, an operating system 48 and one or more software applications 50. The RAM 36 is used by the controller 32 for the temporary storage of data. The operating system 48 may contain code which, when executed by the controller 32 in conjunction with RAM 36, controls operation of each of the hardware components of the terminal.

The controller 32 may take any suitable form. For instance, it may be a microcontroller, plural microcontrollers, a processor, or plural processors.

Figure 4:
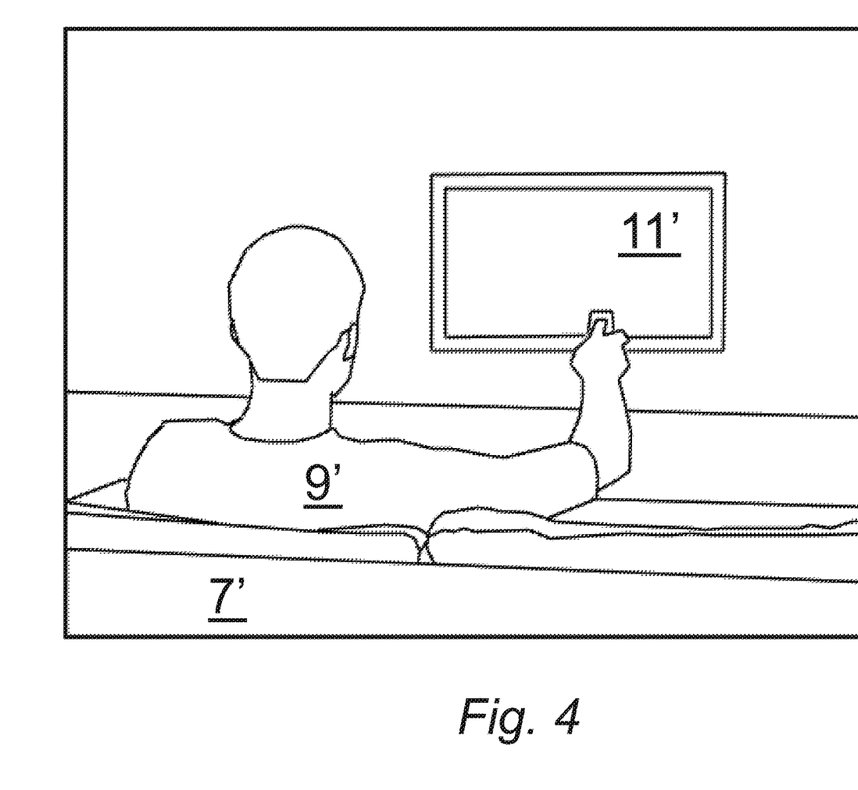
FIG. 4 is a graphical representation of a viewed sector in the FIG. 3 space.

As will be seen from FIGS. 3 and 4, the user's current view is limited to a sector 26 which is significantly less than the full 360 degree field-of-view of the space. The software application 50 is therefore arranged to notify the user of events which occur outside of the viewed sector 26 by means of display within a selected sub-portion of said sector 26.

The sub-portion is an area which is smaller than that of the currently-viewed sector.

In this context, a notification may in some embodiments be a textual or graphical indication of the event. For example, an arrow may be displayed which indicates where the event is. In another example, an icon or emoticon may be displayed which gives an indication of the event or of its relative importance. A new event or fast-moving event may be indicated by a larger icon than an existing or slow-moving event, or a flashing icon may be used for more important events. In another example, a textual summary of the event itself may be displayed, such as "person moving behind you". Any combination of text and graphic notifications can be employed.

In embodiments to be described below, the notification provided is captured video of the detected event, which is overlaid within the selected sub-portion of the current viewed sector 26.

Figure 6:
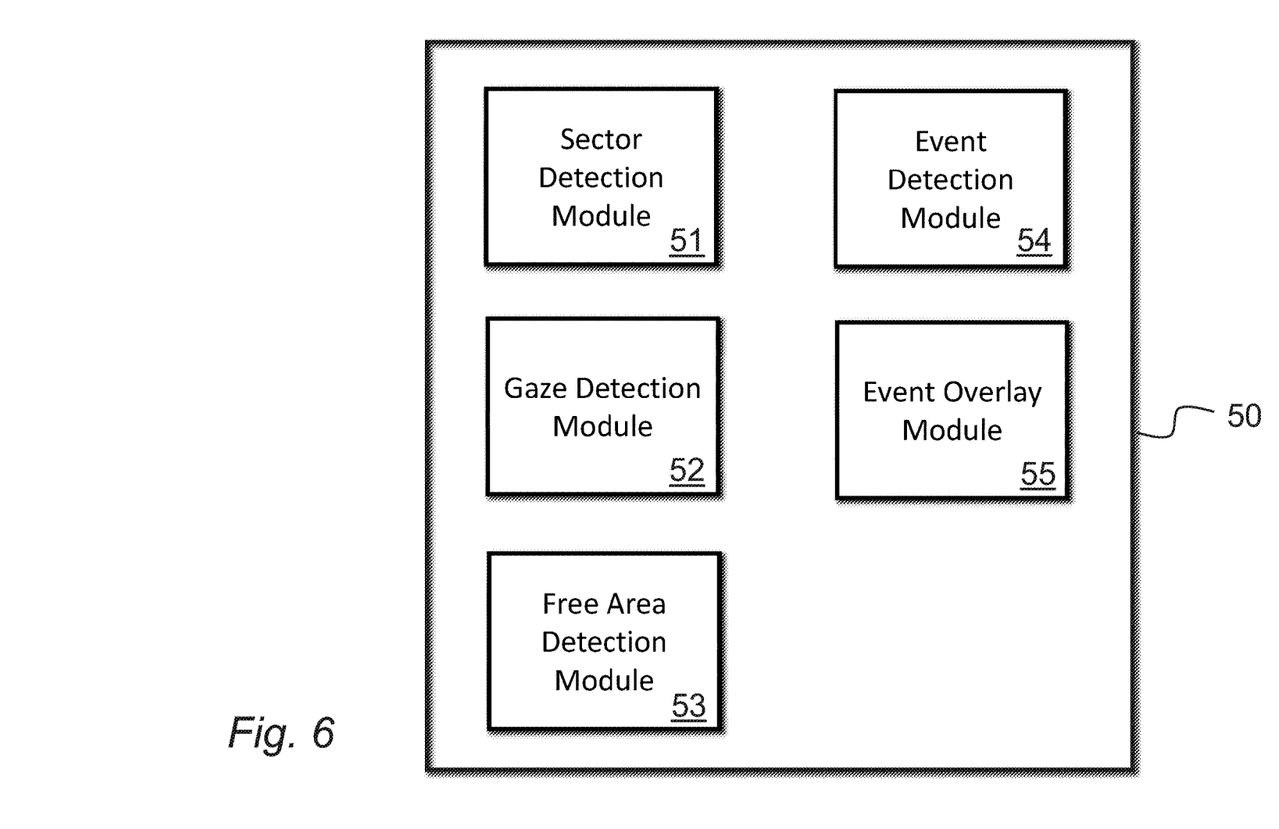
FIG. 6 is a schematic diagram showing functional modules of a software application in accordance with an embodiment.

Referring to FIG. 6, functional modules of the software application 50 are shown.

A sector detection module 51 is configured to detect the current viewed sector 26 and to determine therefrom the non-viewed spatial field, which can be divided into multiple sectors to partition subsequent image processing stages. The different non-viewed sectors may or may not overlap. For example, with reference to FIG. 3, the non-viewed spatial field outside of area 26 can be divided into two, three or more sectors.

A gaze detection module 52 is configured to detect the current gaze direction or focal area of the user using eye-tracking sensors in the VR headset 24; in other words, the module 52 determines which areas within the current sector 26 the user is particularly interested in. In some embodiments, the gaze detection module 52 is not required and user orientation is used to estimate a focal area.

A free area detection module 53 is configured to identify one or more sub-portions of the current viewed sector 26 in which to overlay the event notification. Identification of the or each free sub-portion can use various methods.

In some embodiments, the free area detection module 53 uses the gaze direction data from the gaze detection module 52 and creates a binary mask on the area or areas which the user is focusing on. In this case, the non-masked area or areas is/are the sub-portion(s) that is or are available for overlaying the event notification. Otherwise, overlaying of a notification will disrupt the user experience.

In some embodiments, the free area detection module 53 may use a rule-based method, applying one or more rules stored in the database 40. The rules may, for example, perform visual analysis of the current viewed sector to identify static regions and/or those of relatively uniform colour or intensity. A static region may be the selected sub-portion. Note that gaze direction is not needed in this case.

In some embodiments, the free area detection module 53 may use a machine learning approach, employing a machine learning model trained offline to detect particular objects or areas such as walls and furniture. Neural networks may be used for this purpose. For example, a wall may be the selected sub-portion. Note that gaze direction is not needed in this case.

In some embodiments, the free area detection module 53 may use a score or rank-based approach, whereby, for example, all available areas within the viewed sector but outside of the user's gaze are divided and scored based on some suitability rule with the selected sub-portion being that which maximises the score. For example, where a plurality of static sub-portions are identified outside of the user's gaze direction, each static sub-portion is scored based on factors such as size, distance from the user's gaze etc. and the most optimal sub-portion selected.

In some embodiments, the selected sub-portion may be determined based on size. That is, if it is assumed that the event to be notified from the non-viewed part of the virtual space 30 should not be resized, or be above a minimum size, then the free area should be selected accordingly. Shrinking or distortion of the event should be minimised, preferably.

In some embodiments, the free area detection module 53 may receive manual selection of the sub-portion through a user interface, applicable where the VR content is a non-live feed. The suitable areas from the viewed field 26 can be manually masked during production, or virtually masked during post-production, for example by placing landmarks in such areas. In the case of physical landmarks, tags provided with positioning sensors such as HAIP tags can represent the landmarks and marked on the user interface.

An event detection module 54 is configured through visual analysis of video data from the non-viewed spatial field to identify one or more events for notification to the user, e.g. for overlaying within the sub-portion mentioned above. This may be performed in real time during content consumption, for example to take into account a user's interests, or can be done offline in post-production. In the offline analysis case, the event detection module 54 may analyse all sectors. Then, at consumption phase, the system may take into account only the events which were detected in sectors which are not currently viewed by the considered user.

Instead, in the real-time analysis case, the event detection module 54 continuously attempts to detect events in the non-viewed sector or sectors.

An event may comprise any detected change in video content in sequential video frames. For example, an event may comprise one or more of:
- an object entering the virtual space;
- an object moving or changing its position in the virtual space;
- an object changing its movement in the virtual space;
- an object changing its appearance, for example in terms of colour or size;
- multiple objects interacting with each other, such as a soccer player interacting with a ball and/or with other players.

In some embodiments, a rule or pre-trained learned model approach can be used to avoid or minimise notifying trivial events. A rule-based approach might for example identify that any movement or other change of appearance is an event of interest, or alternatively movement over a particular spatial threshold. In a learned model approach, a pre-trained deep learning model might be applied, for example using a convolutional neural network which extracts visual features in association with a recurrent neural network for handling the temporal aspects of the video. A Long-Short Term Memory Network is one example of a recurrent neural network. Such a model can be pre-trained on appropriate video datasets of common events, such as in Hollywood2, UCF101 etc.

The event detection visual analysis may be applied individually to multiple sectors of the non-viewed field.

The event detection visual analysis may be performed for each one of multiple spatial sub-areas or 'crops' within a given sector. In this context, a crop is a sub-sector of the non-viewed spatial field. If an event is detected within multiple crops, the crop with the minimal, usually smallest, spatial extent may be retained as the final event detection.

An event overlay module 55 is configured to display the event notification in the selected free sub-portion which is being viewed. In some embodiments, particularly where video of the event is overlaid on the sub-portion, the event overlay module 55 may transform the video in dependence on attributes of the sub-portion. This may involve performing spatial or geometric transformations to the event video; this may involve converting a three dimensional or spherical view to a planar surface. The exact distortion and/or orientation transformation may depend on the geometry of the target sub-portion surface. In some embodiments, the event detection module 54 is configured to minimise the required spatial extent of the event video by attempting to re-detect the same event in multiple crop areas of different size. Once a minimum crop size is identified for the available sub-portion, this will represent the event content.

Figure 7:
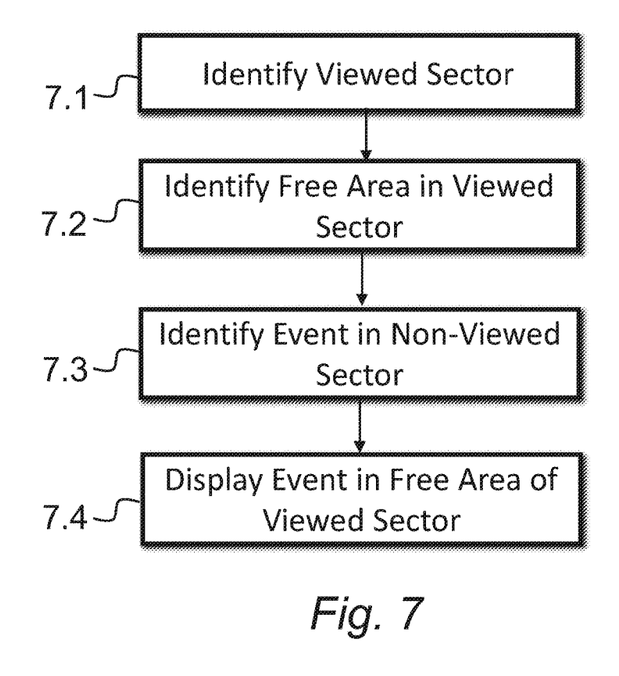
FIG. 7 is a flow diagram showing processing steps performed by the FIG. 6 software application.

FIG. 7 shows processing steps performed by the software application 50 in one embodiment. In a first step 7.1 the viewed sector is identified and, by inference, one or more non-viewed sectors identified. In the next step 7.2, a free sub-portion area is identified in the viewed sector. In step 7.3, an event is identified in the one or more non-viewed sectors. In step 7.4 the event is displayed in the sub-portion identified in step 7.2. Steps 7.2 and 7.3 can be interchanged.

Figure 8:
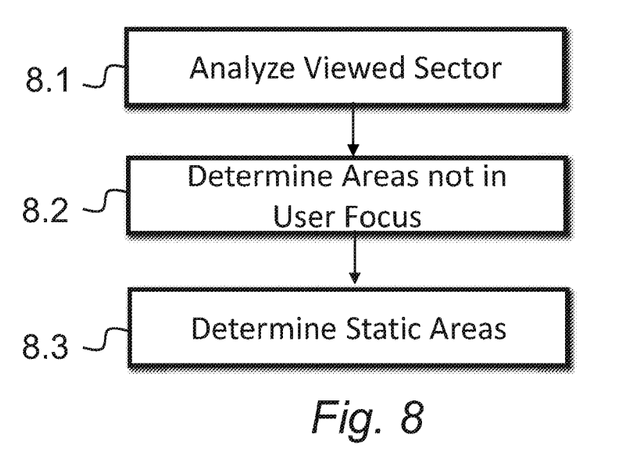
FIG. 8 is a flow diagram showing processing sub-steps performed as part of the second step in FIG. 7.

FIG. 8 shows sub-steps performed as part of step 7.2 in one example embodiment. In step 8.1 visual analysis is performed in the viewed sector. In step 8.2 one or more areas of the viewed sector which are not part of the user's focus are determined, i.e. non-masked areas. In step 8.3, a static area of the non-masked areas is identified as the free sub-portion area.

Figure 9:
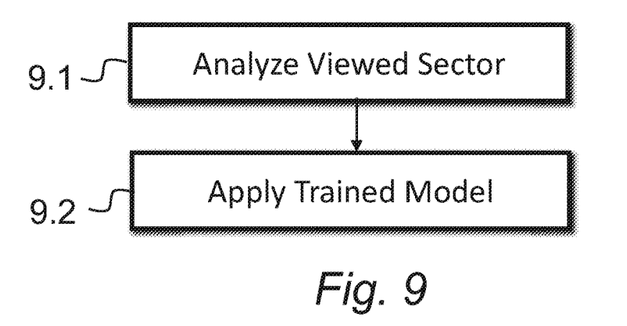
FIG. 9 is a flow diagram showing alternative processing sub-steps performed as part of the second step in FIG. 7.

FIG. 9 shows sub-steps performed as part of step 7.2 in another example embodiment. In step 9.1 visual analysis is performed on the viewed sector. In step 9.2 a trained model is applied to identify the free sub-portion area.

Figure 10:
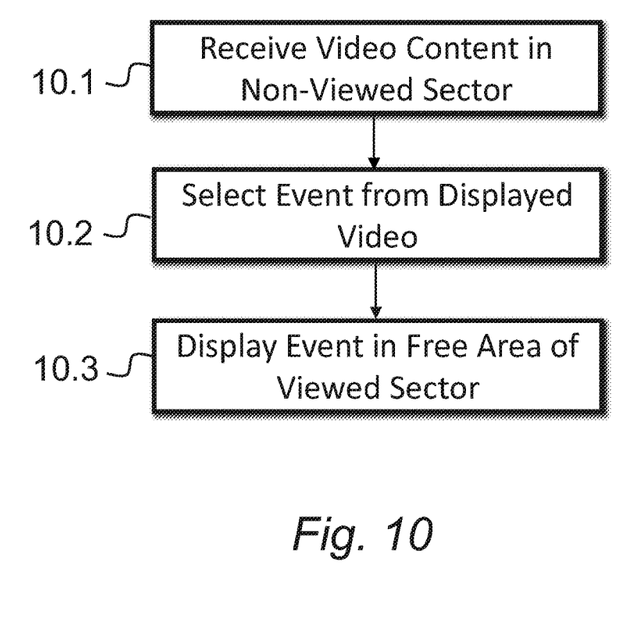
FIG. 10 is a flow diagram showing processing sub-steps performed as part of the third step in FIG. 7.

FIG. 10 shows sub-steps performed as part of step 7.3 in one example embodiment. In step 10.1 visual analysis is performed on video content in the non-viewed sector or sectors. In step 10.2 an event is manually selected, or automatically identified through a rule-based approach, from the video content. In step 10.3 said event is displayed in the free sub-portion area determined in step 7.2.

Figure 11:
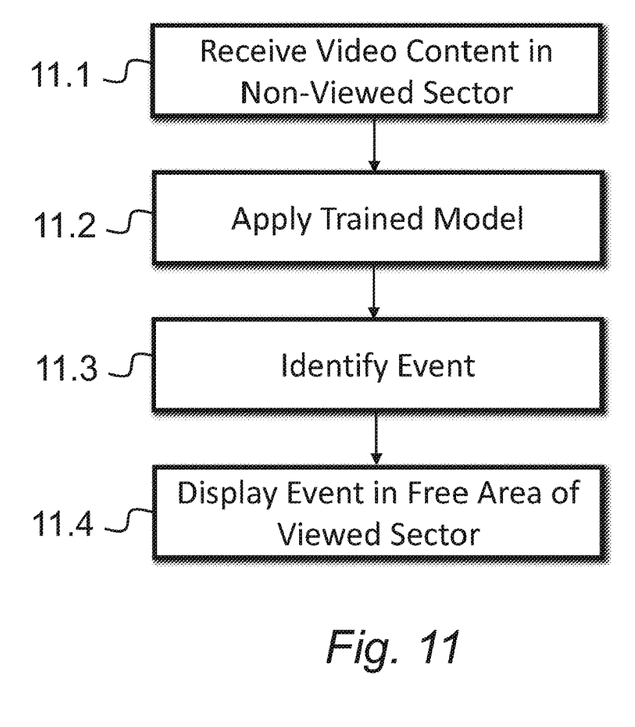
FIG. 11 is a flow diagram showing alternative processing sub-steps performed as part of the third step in FIG. 7.

FIG. 11 shows sub-steps performed as part of step 7.3 in another example embodiment. In step 11.1 visual analysis is performed on video content in the non-viewed sector or sectors. In step 11.2, a trained model is applied to the video content. In step 11.3 an event is automatically identified and in step 11.4 is displayed in the free sub-portion area determined in step 11.4.

Figure 12:
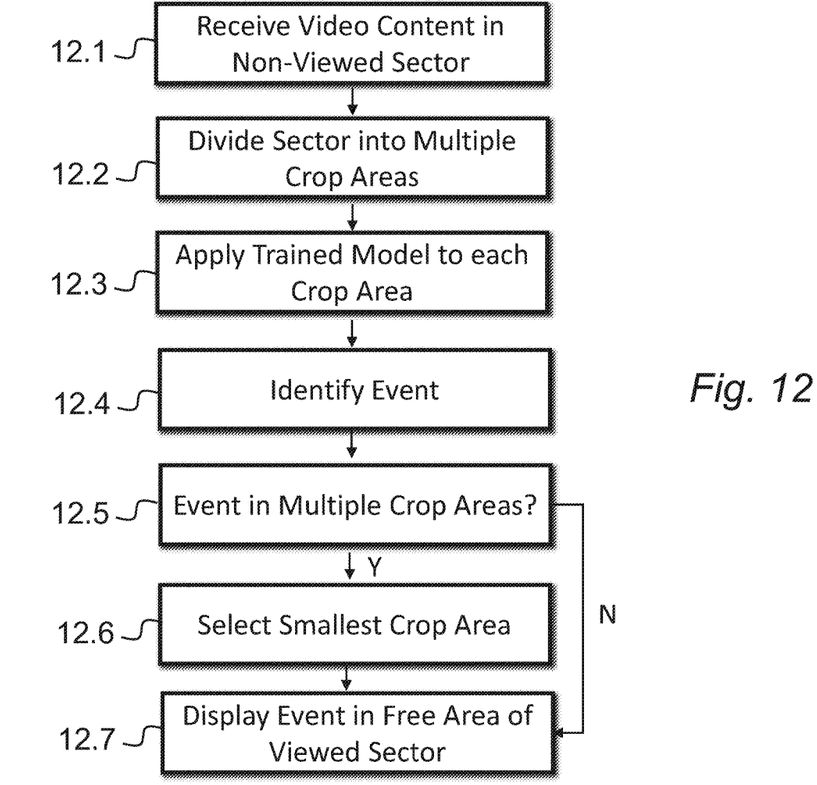
FIG. 12 is a flow diagram showing alternative processing sub-steps performed as part of the third step in FIG. 7.

FIG. 12 shows sub-steps performed as part of step 7.3 in another example embodiment. In this embodiment, visual analysis of each non-viewed sector is performed for multiple crop areas, indicated visually in FIG. 13.

Figure 13:
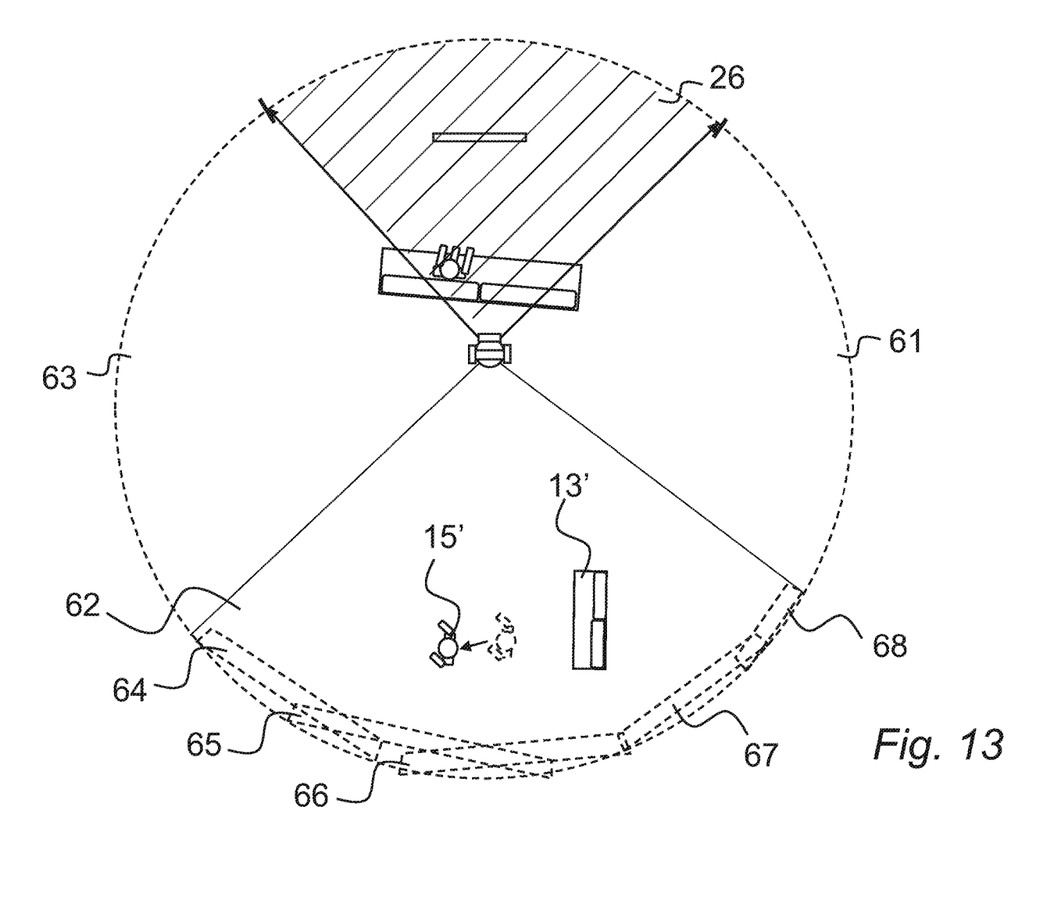
FIG. 13 is a top-plan view of the FIG. 2 virtual reality space which is modified to explain the processing steps in FIG. 12.

In step 12.1, video content is received corresponding to the non-viewed sectors 61, 62, 63. In step 12.2, each said sector 61, 62, 63 is divided into multiple crop areas, being two-dimensional spatial sub-areas. Taking only the sector 62 as an example, video analysis is performed on each of five crop areas 64-68. In step 12.3, a trained model is applied to each of the crop areas 64-68 to identify an event of interest. In step 12.4 the event of interest is identified. In this case, it determined that the person 15' moving relative to the background is the event of interest. In step 12.5 it is determined if said event of interest is present in multiple ones of the crop areas 64-68. If not, then the crop area which shows the event is displayed in the free area in step 12.7. If present in multiple crops, then in step 12.6 it is determined which of the crop areas has the smallest extent. In this case, the moving person 15' appears in both the second and third crops 65, 66 and the third crop has the smallest extent. Therefore, in step 12.7 the video data corresponding to the third crop 66 is displayed in the free sub-portion space within the viewed sector 26. According to an embodiment, a second crop area may consist of a portion of a first crop area. The event detection module may first detect an event within the first crop area. The event detection module 54 may attempt to re-detect the same event within the second crop area. In case of a successful re-detection, the event detection module 54 may select the sub-area corresponding to the second crop, thereby minimizing the required spatial extent of the event video.

Figure 14:
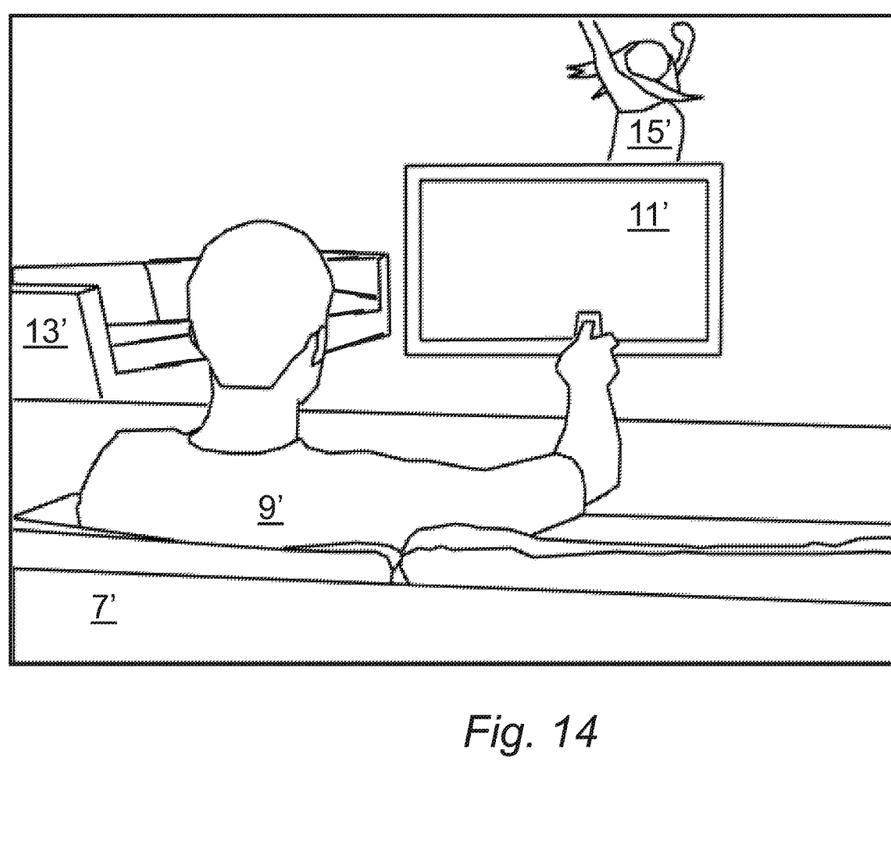
FIG. 14 is a modified version of the FIG. 4 graphical representation in which the viewed sector is augmented by performing one or more embodiments.

FIG. 14 shows the video data presented to the user through the VR headset 24 resulting from the FIG. 12 method. In this case, the free sub-portion area is the background wall behind the television 11'. The video data from crop 66 is overlaid onto this free area to display a composite virtual space in which an event behind the user is notified through static or moving video, and without the user having to turn their head.

It will be appreciated that the above described embodiments are purely illustrative and are not limiting on the scope of protection. Other variations and modifications will be apparent to persons skilled in the art upon reading the present application.

Moreover, the disclosure of the present application should be understood to include any novel features or any novel combination of features either explicitly or implicitly disclosed herein or any generalization thereof and during the prosecution of the present application or of any application derived therefrom, new claims may be formulated to cover any such features and/or combination of such features.

We claim:

1. A method comprising: providing video data representing at least part of a virtual space to a user for viewing;
    identifying a current viewed sector of the virtual space based on user position;
    determining a sub-portion of said current viewed sector;
    identifying an event occurring in video content of at least one non-viewed sector of the virtual space, wherein the event is a detected change in the video content in sequential video frames of the at least one non-viewed sector of the virtual space;
    dividing the at least one non-viewed sector of the virtual space in which the change in the video content is detected into spatial crop areas; and
    displaying in the sub-portion, content indicative of the event, wherein the displaying content indicative of the event comprises displaying one of the spatial crop areas selected based on a size relative to other spatial crop areas-showing the event, and
    receiving video data corresponding to different spatial crop areas of the at least one non-viewed sector and wherein if the identified event occurs within multiple spatial crop areas, the displaying content indicative of the event comprises displaying video data from the smallest crop area.

2. The method of claim 1, further comprising: receiving manual selection through a user interface of the sub-portion of said current viewed sector.

3. The method of claim 1, wherein the determining the sub-portion is performed automatically using image or video attributes within the viewed sector.

4. The method of claim 1, wherein the determining the sub-portion uses predefined rules to identify at least one of substantially static or uniform graphical areas within the viewed sector.

5. The method of claim 3, wherein multiple possible sub-portions are identified and ranked using the predefined rules, and wherein the method further comprises selecting a sub-portion based on rank.

6. The method of claim 3, further comprising detecting a focal area within the current viewed sector and wherein the sub-portion is determined to be outside of the focal area.

7. The method of claim 6, wherein detecting the focal area is based on the detected gaze direction of the user.

8. The method of claim 6, wherein a trained model is used to determine the sub-portion.

9. The method of claim 1, wherein identifying the event comprises receiving manual selection through a user interface.

10. The method of claim 1, wherein identifying the event is performed automatically using predefined rules.

11. The method of claim 1, wherein identifying the event is performed automatically using a trained model.

12. The method of claim 11, wherein the trained model uses a convolutional neural network and a recurrent neural network.

13. The method of claim 10, wherein the at least one of the at least one non-viewed sector is divided into multiple sub-sectors and each is analysed individually to identify an event.

14. The method of claim 1, wherein the video data showing the identified event is substantially kept the same size when displayed.

15. The method of claim 1, wherein the video data showing the identified event is transformed from a three-dimensional or polar representation to a two-dimensional representation.

16. A non-transitory computer-readable medium having stored thereon computer program code, which, when executed by a computer, causes the computer to perform a method, comprising:
    providing video data representing at least part of a virtual space to a user for viewing;
    identifying a current viewed sector of the virtual space based on user position;
    determining a sub-portion of said current viewed sector;
    identifying an event occurring in video content of at least one non-viewed sector of the virtual space, wherein the event is a detected change in the video content in sequential video frames of the at least one non-viewed sector of the virtual space;
    dividing the at least one non-viewed sector of the virtual space in which the change in the video content is detected into spatial crop areas;
    displaying in the sub-portion, content indicative of the event in the sub-portion, wherein the displaying content indicative of the event comprises displaying one of the spatial crop areas selected based on a size relative to other spatial crop areas showing the event; and
    receiving video data corresponding to different spatial crop areas of the at least one non-viewed sector and wherein if the identified event occurs within multiple spatial crop areas, the displaying content indicative of the event comprises displaying video data from the smallest crop area.

17. An apparatus having at least one processor and at least one memory having computer program code stored thereon which when executed controls the apparatus:
    to provide video data representing at least part of a virtual space to a user for viewing;
    to identify a current viewed sector of the virtual space based on user position; to determine a sub-portion of said current viewed sector;
    to identify an event occurring in video content of at least one non-viewed sector of the virtual space, wherein the event is a detected change in the video content in sequential video frames of the at least one non-viewed sector of the virtual space;

to divide the at least one non-viewed sector of the virtual space in which the change in the video content is detected into spatial crop areas;

to display in the sub-portion, content indicative of the event, wherein displaying content indicative of the event comprises displaying one of the spatial crop areas selected based on a size relative to other spatial crop areas showing the event, and to receive video data corresponding to different spatial crop areas of the at least one non-viewed sector and wherein if the identified event occurs within multiple spatial crop areas, the displaying content indicative of the event comprises displaying video data from the smallest crop area.

18. The apparatus of claim 17, wherein the computer program code controls the apparatus to detect a focal area within the current viewed sector and wherein the sub-portion is determined to be outside of the focal area.

19. The method of claim 1, wherein a smallest spatial crop area of the spatial crop areas is selected for display.

* * * * *